US012621757B2

(12) United States Patent
Zhao et al.

(10) Patent No.: US 12,621,757 B2
(45) Date of Patent: May 5, 2026

(54) COMMUNICATION METHOD AND APPARATUS

(71) Applicant: Honor Device Co., Ltd., Shenzhen (CN)

(72) Inventors: Ruiqing Zhao, Shenzhen (CN); Qiao Luo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 287 days.

(21) Appl. No.: 18/270,619

(22) PCT Filed: Dec. 15, 2022

(86) PCT No.: PCT/CN2022/139340
§ 371 (c)(1),
(2) Date: Jun. 30, 2023

(87) PCT Pub. No.: WO2023/134387
PCT Pub. Date: Jul. 20, 2023

(65) Prior Publication Data
US 2024/0389010 A1 Nov. 21, 2024

(30) Foreign Application Priority Data

Jan. 14, 2022 (CN) .......................... 202210042354.7
Jul. 22, 2022 (CN) .......................... 202210870512.8

(51) Int. Cl.
*H04W 48/18* (2009.01)
*H04W 36/36* (2009.01)
(Continued)

(52) U.S. Cl.
CPC ......... *H04W 48/18* (2013.01); *H04W 36/365* (2013.01); *H04W 40/36* (2013.01); *H04W 76/15* (2018.02); *H04W 84/12* (2013.01)

(58) Field of Classification Search
CPC ... H04W 48/18; H04W 36/365; H04W 40/36; H04W 76/15; H04W 84/12; H04W 36/1446; H04W 88/06; Y02D 30/70
USPC ........................................................ 455/439
See application file for complete search history.

(56) References Cited

U.S. PATENT DOCUMENTS 10,051,607 B2    8/2018  Shang
10,841,863 B2 *  11/2020 Keller ................... H04W 76/16
(Continued)

FOREIGN PATENT DOCUMENTS

CN          103048961 A      4/2013
CN          103763754 A      4/2014
(Continued)

OTHER PUBLICATIONS

Machine English Translation of WO 2021/190609. pp. 1-12. (Year: 2025).*

*Primary Examiner* — Don N Vo
(74) *Attorney, Agent, or Firm* — Slater Matsil, LLP

(57) ABSTRACT

This application provides a communication method and an apparatus. The method includes: accessing, by an electronic device, a first network; performing network probing on the first network, where it is detected that the Internet cannot be accessed through the first network; and transmitting, in the first network and a second network, to-be-transmitted data through a network that matches the to-be-transmitted data, where the first network is different from the second network, and the electronic device can access the second network and maintain a connection to the first network. The Internet can be accessed through the second network. Even if the Internet cannot be accessed through the first network, the electronic device can still access the Internet through the second
(Continued)

network, and is not disconnected from the first network, maintaining the capability of the first network to transmit data.

20 Claims, 12 Drawing Sheets

(51) Int. Cl.
*H04W 40/36* (2009.01)
*H04W 76/15* (2018.01)
*H04W 84/12* (2009.01)

(56) References Cited

U.S. PATENT DOCUMENTS

| | | | | |
|---|---|---|---|---|
| 11,546,841 | B2 * | 1/2023 | Rinne | ............... H04W 36/1443 |
| 2015/0065157 | A1 | 3/2015 | Homchaudhuri et al. | |
| 2016/0165508 | A1 | 6/2016 | Jin | |
| 2018/0184341 | A1 * | 6/2018 | Faccin | ............ H04W 36/00837 |
| 2020/0081870 | A1 * | 3/2020 | McCoy | ............... G06F 16/1805 |
| 2020/0288345 | A1 | 9/2020 | Chu | |
| 2021/0258851 | A1 * | 8/2021 | Xu | ...................... H04W 36/302 |
| 2023/0018089 | A1 | 1/2023 | Zhu | |
| 2023/0199886 | A1 | 6/2023 | Wang et al. | |

FOREIGN PATENT DOCUMENTS

| | | |
|---|---|---|
| CN | 105530672 A | 4/2016 |
| CN | 105635472 A | 6/2016 |
| CN | 105873146 A | 8/2016 |
| CN | 108174434 A | 6/2018 |
| CN | 112291787 A | 1/2021 |
| CN | 114666864 A | 6/2022 |
| WO | 2019120188 A1 | 6/2019 |
| WO | 2021190609 A1 | 9/2021 |

* cited by examiner (1)
Enable a wireless
local area network
function (2)
Connected to a
wireless hotspot of
a printer (3)
Output first prompt
information, and a user
selects yes (4)
Output second prompt
information, and the
user selects yes (5)
View a routing table
through a computer

COMMUNICATION METHOD AND APPARATUS

CROSS-REFERENCE TO RELATED APPLICATIONS

This application is a national stage of International Application No. PCT/CN2022/139340, filed on Dec. 15, 2022, which claims priority to Chinese Patent Application No. 202210042354.7, filed on Jan. 14, 2022, and Chinese Patent Application No. 202210870512.8, filed on Jul. 22, 2022. The disclosures of all the aforementioned applications are hereby incorporated by reference in their entireties.

TECHNICAL FIELD

This application relates to the field of communication technologies, and in particular, to a communication method and an apparatus.

BACKGROUND

An electronic device may support multiple network access manners, including cellular network access, wireless network access, Ethernet access, and universal serial bus (universal serial bus, USB) network sharing. At a moment, the electronic device may access, in a network access manner, a network corresponding to the network access manner. If another network needs to be accessed, a user may manually change the network access manner of the electronic device.

SUMMARY

This application provides a communication method and an apparatus, to resolve a problem that an electronic device accesses a network in one network access manner.

To achieve the foregoing objective, this application provides the following technical solutions.

This application provides a communication method. The method includes: accessing, by an electronic device, a first network; performing network probing on the first network, where it is detected that the Internet cannot be accessed through the first network; and transmitting, in the first network and a second network, to-be-transmitted data through a network that matches the to-be-transmitted data, where the first network is different from the second network, and the electronic device accesses the second network and maintains a connection to the first network. The Internet can be accessed through the second network. Even if the Internet cannot be accessed through the first network, the electronic device can still access the Internet through the second network, and is not disconnected from the first network, maintaining the capability of the first network to transmit data. As a result, the electronic device can access two different types of networks at the same time, and transmit data by using the two different types of networks. The two different types of networks may correspond to different network access manners, for the electronic device to access different types of networks in different network access manners.

For example, the first network is a wireless local area network, and the second network is a cellular network. When the Internet cannot be accessed through the wireless local area network, the electronic device may access the Internet through the cellular network. In this case, the electronic device can transmit, through the wireless local area network, data to a device in a same wireless local area network as the electronic device, and can access the Internet through the cellular network, so that the electronic device has the capabilities of interaction within a local area network and accessing a wide area network (the Internet).

Optionally, the transmitting, in the first network and a second network, to-be-transmitted data through a network that matches the to-be-transmitted data includes: transmitting first to-be-transmitted data through the first network that matches the first to-be-transmitted data; and transmitting second to-be-transmitted data through the second network that matches the second to-be-transmitted data, where the first to-be-transmitted data and the second to-be-transmitted data may be transmitted at the same time. When transmitting data through the first network and the second network, the electronic device transmits to-be-transmitted data through a network that matches the to-be-transmitted data, and can transmit data through the first network and the second network at the same time.

Optionally, the method further includes: controlling the electronic device to access the second network and maintain the connection to the first network; and adding a routing rule of the first network, where a priority of the routing rule of the first network is higher than a priority of a routing rule of the second network, and the routing rule of the first network is a condition for transmission through the first network. The transmitting, in the first network and a second network, to-be-transmitted data through a network that matches the to-be-transmitted data includes: transmitting, in the first network and the second network based on a network parameter of the to-be-transmitted data and the routing rule of the first network, the to-be-transmitted data through the network that matches the to-be-transmitted data.

In the embodiments, the electronic device may access the second network and then maintain the connection to the first network; and in order to transmit data through the first network and the second network at the same time, the electronic device may add the routing rule of the first network, where the priority of the routing rule of the first network is higher than the priority of the routing rule of the second network, and the routing rule of the first network is the condition for transmission through the first network. If the to-be-transmitted data satisfies the condition for transmission through the first network, the electronic device may transmit the to-be-transmitted data through the first network. The priority of the routing rule of the first network is higher than the priority of the routing rule of the second network. Therefore, when there is to-be-transmitted data in the electronic device, first the to-be-transmitted data is matched with the routing rule of the first network. If the to-be-transmitted data matches the routing rule of the first network, the to-be-transmitted data is transmitted through the first network. If the to-be-transmitted data does not match the routing rule of the first network, the to-be-transmitted data is matched with the routing rule of the second network. If the to-be-transmitted data matches the routing rule of the second network, the to-be-transmitted data is transmitted through the second network. Therefore, data transmission is controlled according to the routing rule of the first network and the routing rule of the second network, and the electronic device can transmit data through the two networks at the same time according to the routing rules of the two networks.

Optionally, the condition for transmission through the first network is that a target address is an address of the first network. The transmitting, in the first network and the second network based on a network parameter of the to-betransmitted data and the routing rule of the first network, the to-be-transmitted data through the network that matches the to-be-transmitted data includes: transmitting the to-be-transmitted data through the first network when the target address of the to-be-transmitted data is the address of the first network; and transmitting the to-be-transmitted data through the second network when the target address of the to-be-transmitted data is an address other than the address of the first network. The address of the first network is written into the routing rule of the first network. If the target address of the to-be-transmitted data is the address of the first network, the to-be-transmitted data is transmitted through the first network. If the target address of the to-be-transmitted data is an address other than the address of the first network, the to-be-transmitted data is transmitted through the second network. Therefore, the electronic device can control data transmission through the first network and the second network based on the address of the first network.

Optionally, an identifier of a network device and/or an address of the network device is recorded in the routing rule of the first network, and the electronic device transmits data through the network device indicated by the identifier of the network device and/or the address of the network device. An identifier of a network device and/or an address of a network device identifies a network device. When data is transmitted through the first network, the data is transmitted by the network device indicated by the identifier of the network device and/or the address of the network device.

Optionally, the method further includes: outputting first prompt information when it is detected that the Internet cannot be accessed through the first network; and controlling, in response to a first selection operation on the first prompt information, the electronic device to access the second network and maintain the connection to the first network, where the first selection operation indicates that the first network is not used. That the Internet cannot be accessed through the first network means that the first network does not have the capability to access the Internet. The first prompt information prompts that the Internet cannot be accessed through the first network and prompts the user to determine whether to continue using the first network. The first selection operation is an operation of not using the first network performed by the user in response to the first prompt information. After the electronic device receives the first selection operation, the electronic device is controlled to access the second network and maintain the connection to the first network. In other words, the operation of not using the first network performed by the user is omitted, or it considers by default that a network parallel control setting is enabled. The electronic device maintains the connection to the first network and accesses the second network, so that the electronic device can transmit data through the first network and the second network at the same time.

Optionally, the method further includes: outputting prompt information when it is detected that the Internet cannot be accessed through the first network, where the prompt information indicates whether to use the first network or whether to enable the network parallel control setting. adding the routing rule of the first network if an operation of enabling the network parallel control setting is received, where the priority of the routing rule of the first network is higher than the priority of the routing rule of the second network, and the routing rule of the first network is the condition for transmission through the first network, so that the electronic device can transmit data through at least two networks due to the network parallel control setting;

controlling, if an operation of using the first network and disabling the network parallel control setting is received, the electronic device to maintain the connection to the first network and be disconnected from the second network; and controlling, if an operation of not using the first network and disabling the network parallel control setting is received, the electronic device to maintain a connection to the second network and be disconnected from the first network.

Whether to enable the network parallel control setting may be outputted to the user in the form of prompt information. Alternatively, a setting interface is added in the electronic device, a setting option in the setting interface is whether to enable the network parallel control setting, and the user may enable or disable the network parallel control setting in the setting interface. After the network parallel control setting is enabled, regardless of whether the first network is used or not, the routing rule of the first network is added, so that the electronic device can use the first network and the second network at the same time. In a case that the network parallel control setting is disabled, if the first network is used, the electronic device maintains the connection to the first network and is disconnected from the second network, so that the electronic device can use the first network; and if the first network is not used, the electronic device maintains the connection to the second network and is disconnected from the first network, so that the electronic device can use the second network.

Optionally, the method further includes: determining whether an Internet access status of the first network has been prompted when it is detected that the Internet cannot be accessed through the first network; and triggering output of prompt information if the Internet access status of the first network has not been prompted.

Optionally, the method further includes: adding the routing rule of the first network if the Internet access status of the first network has been prompted and the network parallel control setting is enabled, where the priority of the routing rule of the first network is higher than the priority of the routing rule of the second network.

Optionally, the method further includes: outputting second prompt information when it is detected that the Internet cannot be accessed through the first network; and controlling, in response to a second selection operation on the second prompt information, the electronic device to access the second network and maintain the connection to the first network, where the second selection operation indicates that the network parallel control setting is enabled, and the electronic device can transmit data through at least two networks due to the network parallel control setting. When it is detected that the first network does not have the capability to access the Internet, the second prompt information that prompts the user to determine whether to enable the network parallel control setting is outputted, for the user to determine whether to enable the network parallel control setting, that is, for the user to determine whether to use the first network and the second network at the same time.

Optionally, the first network is a wireless local area network, and the second network is a cellular network.

According to a second aspect, this application provides an electronic device, including a memory and a processor. The memory is configured to store instructions executable by the processor, and the processor executes the instructions, so that the electronic device performs the communication method above.

According to a third aspect, this application provides a computer-readable storage medium, storing a computer program. The computer program, when run by a processor of an electronic device, causes the electronic device to perform the communication method above.

DETAILED DESCRIPTION OF ILLUSTRATIVE EMBODIMENTS

The following clearly and completely describes technical solutions in embodiments of this application with reference to the accompanying drawings in the embodiments of this application. Terms used in the following embodiments are only intended to describe particular embodiments, and are not intended to limit this application. As used in this specification and the claims of this application, a singular expression form, namely, "one", "a", "the", "foregoing", "said", or "this", is intended to also include "one or more", unless clearly indicated to the contrary in the context. It should be further understood that, in the embodiments of this application, "one or more" means one, two, or more. The term "and/or" describes an association between associated objects and indicates that three associations may exist. For example, A and/or B may indicate that only A exists, both A and B exist, and only B exists, where A and B may be singular or plural. The character "/" generally indicates an "or" relationship between the associated objects.

In the descriptions of this specification, "an embodiment", "some embodiments", or the like indicates that one or more embodiments of this application include specific features, structures, or characteristics described with reference to the embodiments. Therefore, the statements "in one embodiment", "in some embodiments", "in some other embodiments", "in other embodiments", and the like in the differences in this specification do not necessarily refer to the same embodiment, but mean that "one or more but not all embodiments", unless otherwise specially emphasized in other ways. The terms "include", "contain", "have" and their variations mean "including but not limited to", unless otherwise specially emphasized in other ways.

"A plurality of" involved in the embodiments of this application refers to two or more. It is to be noted that, in descriptions of the embodiments of this application, terms such as "first" and "second" are merely used for distinguishing descriptions, and cannot be understood as an indication or implication of relative importance, or an indication or implication of a sequence.

In the embodiments, an electronic device may support multiple network access manners, including cellular network access, wireless network access, Ethernet access, and universal serial bus (universal serial bus, USB) network sharing. At a moment, the electronic device may access, in a network access manner, a network corresponding to the network access manner. If the electronic device needs to access another network, a user may manually change the network access manner of the electronic device.

Figure 1:
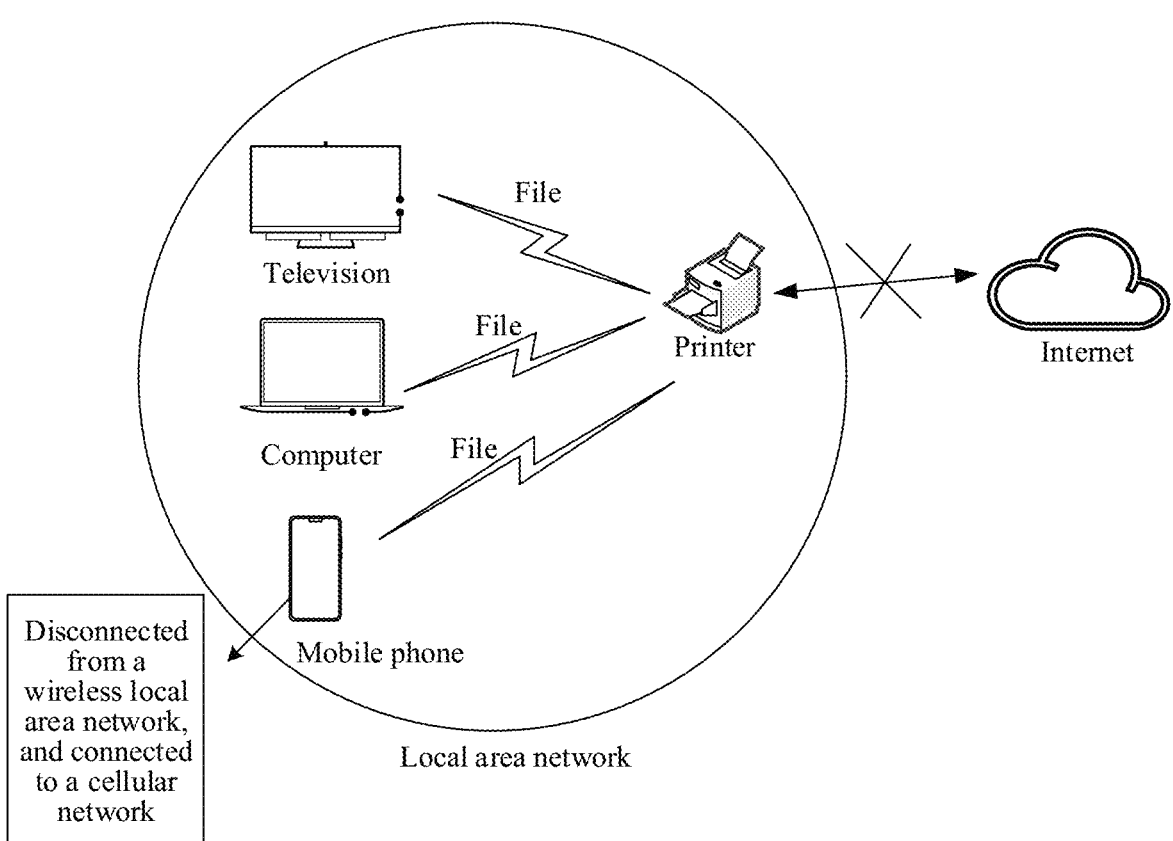
FIG. 1 is a schematic diagram of a scenario according to this application.

In a remote printing scenario shown in FIG. 1, electronic devices, such as a mobile phone and a computer, and a printer access a same wireless local area network. The mobile phone or computer may transfer files to the printer through the wireless local area network, and the printer prints the files. For example, in the remote printing scenario, the printer may provide a wireless hotspot, the electronic devices such as the mobile phone and the computer may access the wireless hotspot provided by the printer, the electronic devices may send to-be-printed files to the printer, and the printer receives the files and prints the files. However, the wireless hotspot provided by the printer does not have the capability to access the Internet. For example, the printer cannot access websites such as Baidu and IQIYI through the wireless hotspot, and consequently the electronic devices cannot access Baidu, IQIYI, and the like. Therefore, when the electronic device accesses the wireless hotspot of the printer, if the electronic device needs to access the Internet, the electronic device breaks a connection to the wireless hotspot and changes from a wireless network access manner to a cellular network access manner, and then the electronic device is connected to the cellular network and accesses the Internet through the cellular network. As a result, the electronic device can access one type of networks only in one network access manner. Although the electronic device can access the Internet through the cellular network, the electronic device breaks the connection to the printer, and cannot transfer files to the printer. Consequently, a remote printing service of the electronic device is interrupted.

Figure 2:
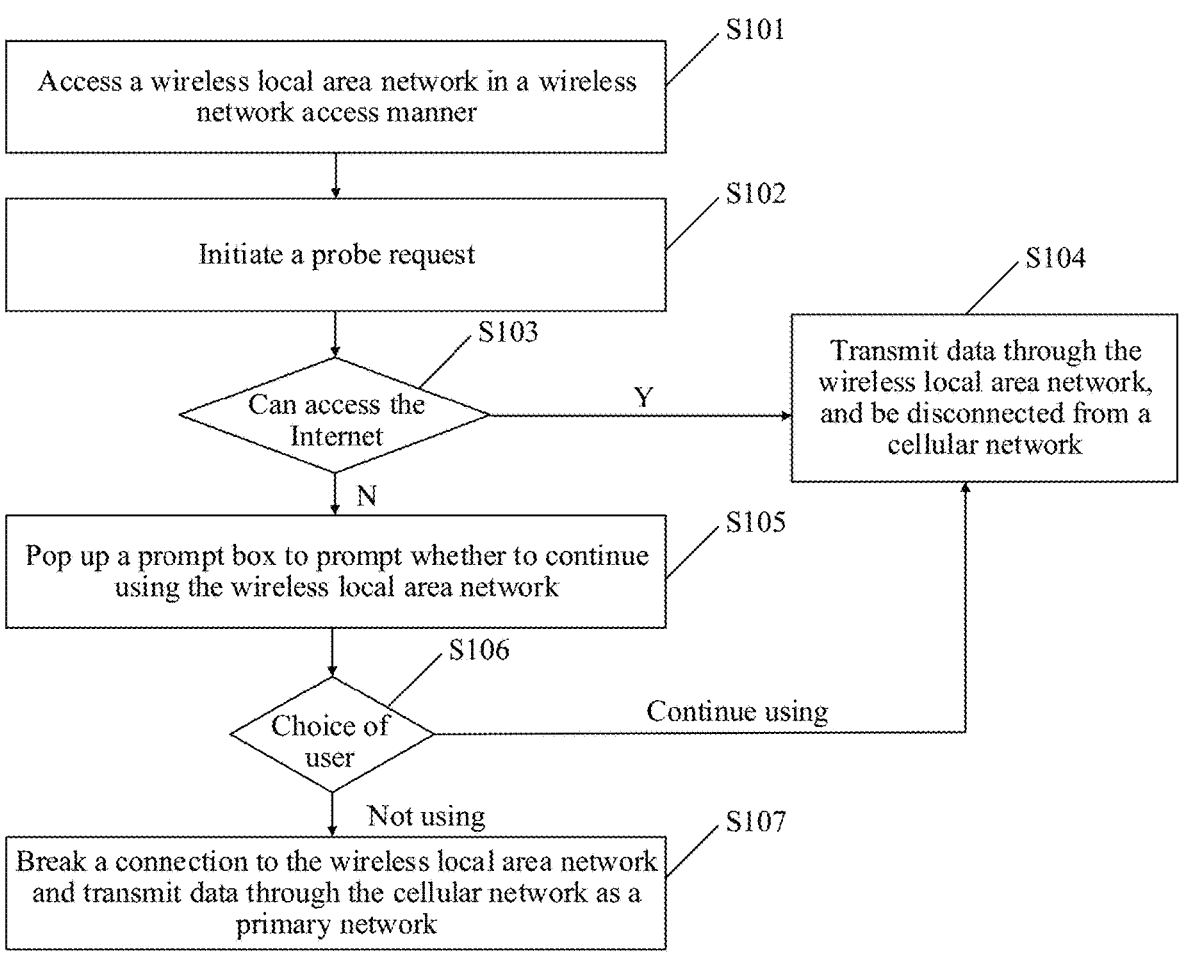
FIG. 2 is a flowchart of a communication method according to this application.

As shown in FIG. 2, the process may include the following steps.

S101. An electronic device accesses a wireless local area network in a wireless network access manner.

S102. The electronic device initiates a probe request. The probe request is used to detect whether the Internet can be accessed through the wireless local area network. The probe request may be a hyper text transfer protocol (hyper text transfer protocol, HTTP) request. The form of the HTTP request is not described in the embodiments.

S103. The electronic device receives a status code and determines, based on the status code, whether the Internet can be accessed through the wireless local area network. If the Internet can be accessed through the wireless local area network, step S104 is performed. If the Internet cannot be accessed through the wireless local area network, step S105 is performed. After initiating the probe request, the electronic device may receive the status code that matches the probe request. A value of the status code indicates whether a current probe succeeds. If the current probe succeeds, the Internet can be accessed through the wireless local area network. If the current probe fails, the Internet cannot be accessed through the wireless local area network.

For example, a status code being 200 indicates that a probe succeeds. If the received status code is 200, it is determined that the Internet can be accessed through the wireless local area network. A status code being 400 indicates that a probe fails. If the received status code is 400, it is determined that the Internet cannot be accessed through the wireless local area network.

In addition, the status code may also indicate whether the wireless local area network is a portal (Portal) authentication network. For the portal authentication network, identity authentication may be performed on the electronic device after the electronic device accesses the portal authentication network. If the identity authentication fails, access to the Internet is restricted. If the identity authentication succeeds, access to the Internet is allowed.

If the status code indicates that the wireless local area network is a portal authentication network, and access to the Internet fails, the electronic device may output prompt information to prompt a user to perform identity authentication. When the identity authentication succeeds, the electronic device may access the Internet through the wireless local area network.

S104. The electronic device transmits data by using the wireless local area network, where the electronic device is disconnected from a cellular network.

S105. A prompt box pops up on the electronic device to prompt whether to continue using the wireless local area network.

S106. The electronic device receives a choice from the user. If the user chooses not to use the wireless local area network, step S107 is performed. If the user chooses to use the wireless local area network, step S104 is performed.

S107. The electronic device breaks a connection to the wireless local area network, and transmits data through the cellular network as a primary network.

It can be learned from the foregoing process that the electronic device can access a local area network in a wireless network access manner, and electronic devices that access a same local area network can communicate with each other, for example, electronic devices that access a same local area network can transmit data to each other. If a user wants to access the Internet, the user manually changes a network access manner of the electronic device from the wireless network access manner to the cellular network access manner, so that the electronic device accesses the cellular network and accesses the Internet through the cellular network. Although the electronic device supports multiple network access manners and accesses different types of networks in different network access manners, the electronic device can access one type of networks only in one network access manner during use.

To resolve this problem, the embodiments provide a communication method. The communication method includes the following steps. An electronic device accesses a first network in a first network access manner. If the Internet is restricted to be accessed through the first network (that is, the first network does not have the capability to access the Internet), the electronic device obtains a target address of the first network, maintains the first network access manner, and accesses a second network in a second network access manner, where the Internet is allowed to be accessed through the second network. The electronic device is controlled, based on an address of the first network, to use the first network and the second network. In an example, if the target address is the address of the first network, the electronic device uses the first network; and if the target address is an address other than the address of the first network, the electronic device uses the second network. Therefore, even if the Internet cannot be accessed through the first network, the electronic device can still access the Internet through the second network, and is not disconnected from the first network, maintaining the capability of the first network to transmit data. As a result, the electronic device can access different types of networks in different network access manners, and can be controlled to use different types of networks based on an address of a network.

Figure 3:
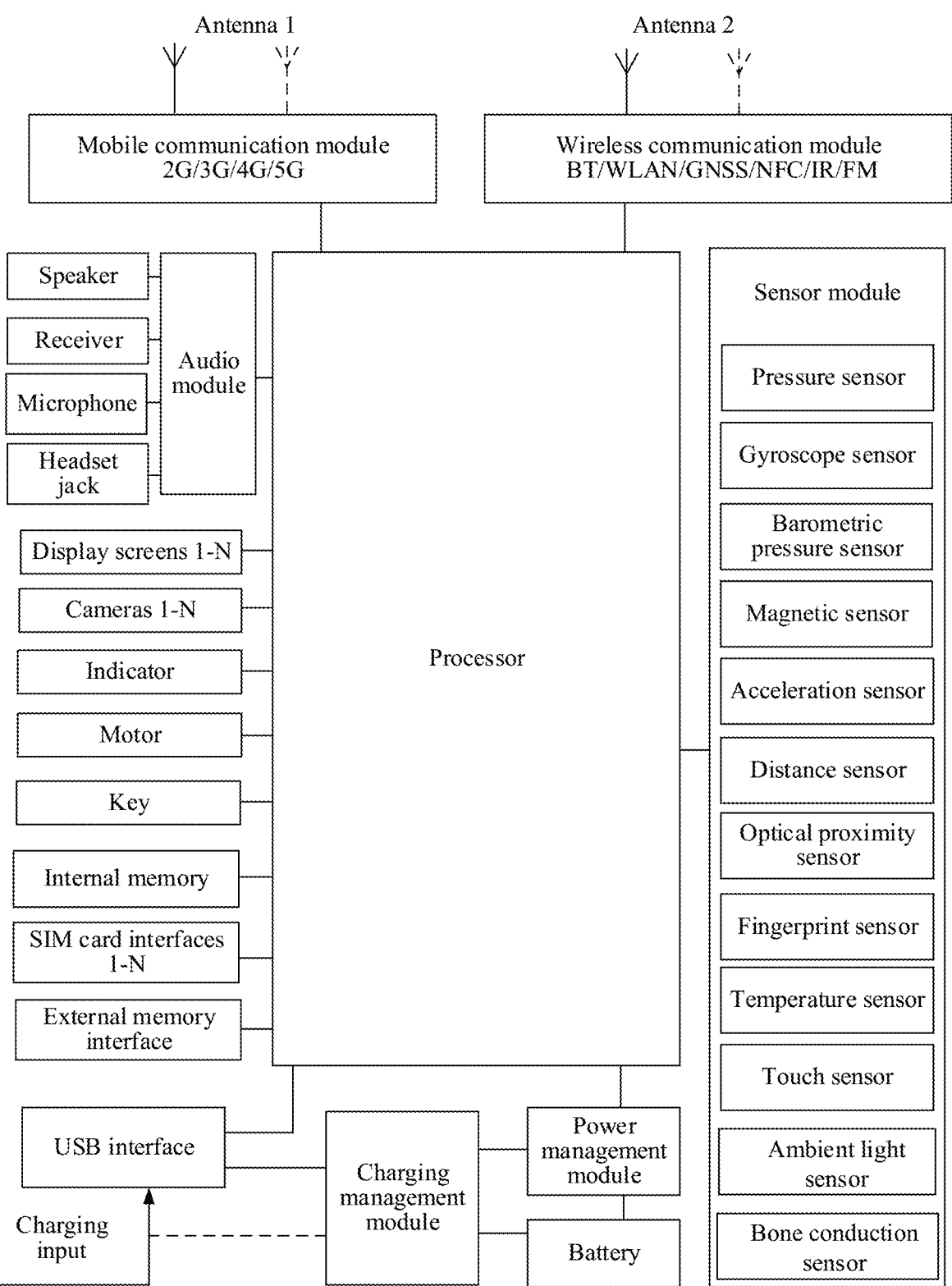
FIG. 3 is a diagram of a hardware structure of an electronic device according to this application.

The communication method may be applied to an electronic device shown in FIG. 3. In some embodiments, the electronic device may be a mobile phone, a tablet computer, a desktop computer, a laptop computer, a notebook computer, an ultra-mobile personal computer (ultra-mobile personal computer, UMPC), a handheld computer, a netbook, a personal digital assistant (personal digital assistant, PDA), a wearable electronic device, a smart watch, or the like. A specific form of the electronic device is not specially limited in this application.

As shown in FIG. 3, the electronic device may include: a processor, an external memory interface, an internal memory, a universal serial bus (universal serial bus, USB) interface, a charging management module, a power management module, a battery, an antenna 1, an antenna 2, a mobile communication module, a wireless communication module, a sensor module, a key, a motor, an indicator, an audio module, a camera, a display screen, a subscriber identification module (subscriber identification module, SIM) card interface, and the like. The audio module may include a speaker, a phone receiver, a microphone, a headset jack, and the like. The sensor module may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It may be understood that the schematic structure in the embodiments constitutes no specific limitation on the electronic device. In some other embodiments, the electronic device may include more or fewer components than those shown in the figure, or some components may be combined, or some components may be split, or components are arranged in different manners. The components in the figure may be implemented by hardware, software, or a combination of software and hardware.

The processor may include one or more processing units. For example, the processor may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be separate devices, or may be integrated into one or more processors. The processor may be a nerve center and a command center of the electronic device. The controller may generate an operation control signal based on an instruction operation code and a timing signal, to implement control of fetching an instruction and executing the instruction.

The display screen is configured to display images, videos, a series of graphical user interfaces (graphical user interface, GUI), and the like, for example, display network-associated prompt information.

The external memory interface may be configured to be connected to an external storage card, for example, a micro SD card, to expand a storage capability of the electronic device. The external storage card communicates with the processor through the external memory interface, to implement a data storage function, for example, store a file such as configuration information of a network in the external storage card. The internal memory may be configured to store computer-executable program code. The executable program code includes instructions. The processor runs the instructions stored in the internal memory, to perform various function applications and data processing of the electronic device. For example, in this application, the processor runs the instructions stored in the internal memory to cause the electronic device to perform the communication method provided in this application.

The antenna 1 and the antenna 2 are configured to transmit and receive electromagnetic wave signals. Each antenna in the electronic device may be configured to cover one or more communication frequency bands. Different antennas may further be multiplexed to improve utilization of the antennas. For example, the antenna 1 may be multiplexed into a diversity antenna of a wireless local area network. In some other embodiments, the antennas may be used with a tuning switch.

The mobile communication module may provide a solution to wireless communication such as 2G/3G/4G/5G applied to the electronic device. The wireless communication module may provide a solution to wireless communication applied to the electronic device, for example, a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology.

Figure 4:
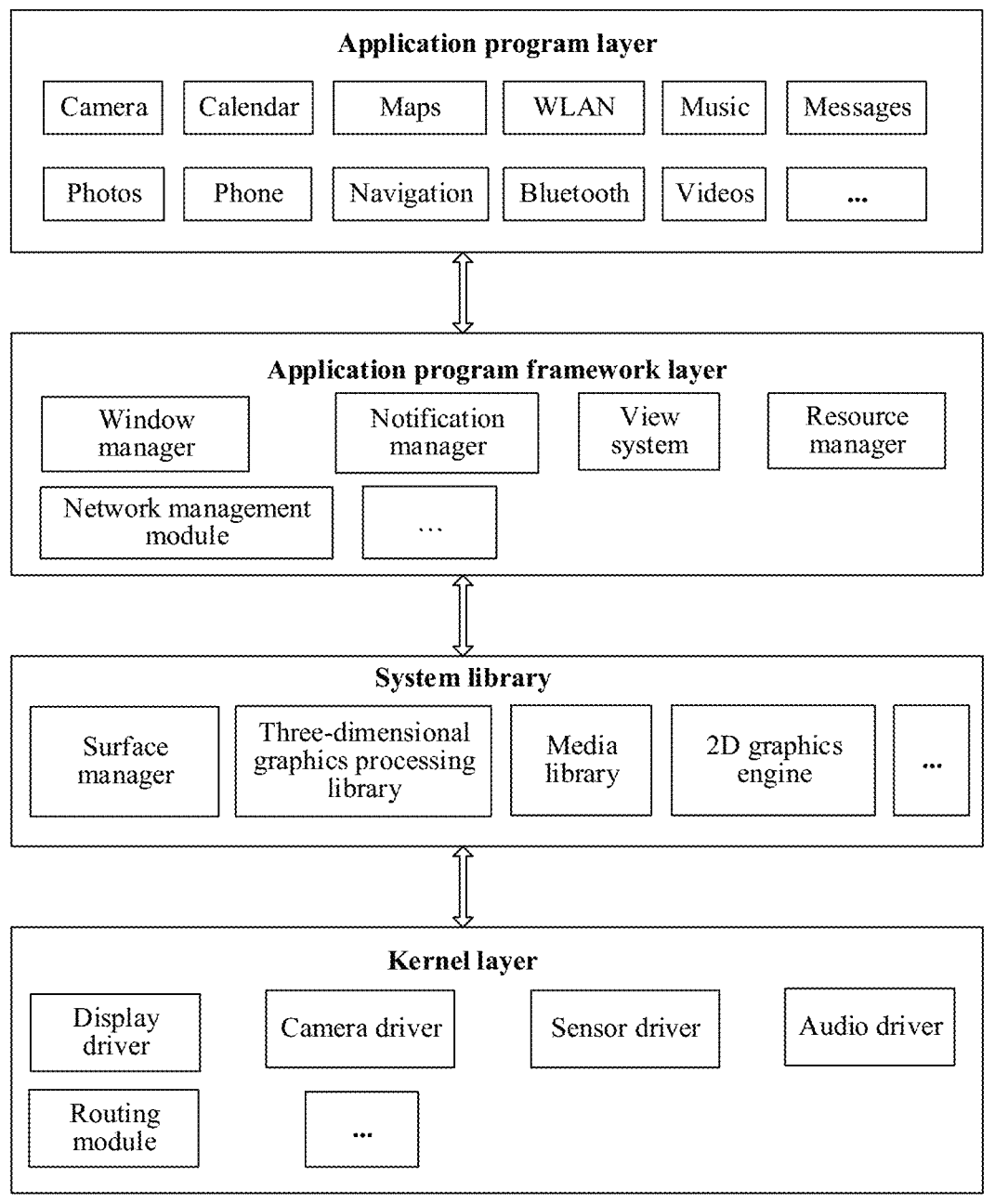
FIG. 4 is a diagram of a software architecture of an electronic device according to this application.

The operating system of the electronic device may use a layered architecture, an event-driven architecture, a microkernel architecture, a micro service architecture, or a cloud architecture. In the embodiments of this application, the software structure of the electronic device is exemplarily described by using an Android system with a layered architecture as an example. FIG. 4 is a block diagram of a software structure of an electronic device. In the layered architecture, software is divided into several layers, and each layer has a clear role and task. Layers communicate with each other through a software interface. Using an Android system as an example, in some embodiments, the Android system is divided into four layers that are respectively an application layer, an application framework layer (Framework), a class library layer, and a system kernel layer (Kernel) from top to bottom.

The application layer may include a series of application packages. As shown in FIG. 4, the application packages may include APPs such as camera, photos, calendar, phone, maps, navigation, WLAN, Bluetooth, music, videos, and SMS messages. The application framework layer provides an application programming interface (application programming interface, API) and a programming framework for applications at the application layer. The application framework layer includes some predefined functions. As shown in FIG. 4, the application framework layer may include a window manager, a content provider, a view system, a phone manager, a resource manager, a notification manager, and the like. In FIG. 4, the application framework layer may further include a network management module.

A system library may include a plurality of functional modules, such as a surface manager (surface manager), a media library (Media Libraries), a three-dimensional graphics processing library (for example, OpenGL ES), and a 2D graphics engine (for example, SGL). The kernel layer is a layer between hardware and software. The kernel layer includes at least a display driver, a camera driver, an audio driver, a sensor driver, and a routing module.

In the embodiments, the network management module may perform network probing. An objective of network probing may be to detect whether the electronic device can access the Internet through a first network that is currently accessed by the electronic device. If the electronic device cannot access the Internet through the first network that is currently accessed by the electronic device, the display driver controls the electronic device to display first prompt information. The first prompt information indicates whether to continue using the first network. If a user chooses to continue using the first network, the display driver may control the electronic device to display second prompt information. The second prompt information indicates whether to enable a network parallel control setting. If the user enables the network parallel control setting, the routing module may configure a routing rule, and the routing module controls data transmission according to the routing rule. The network parallel control setting may be that the electronic device may access two different types of networks in two different network access manners at the same time. The routing rule may be that the electronic device may transmit data through two different types of networks. For example, the electronic device may access a wireless local area network in a wireless network access manner, and at the same time, may access a cellular network in a cellular network access manner. The routing rule may indicate the electronic device to transmit data through the wireless local area network and the cellular network. For example, in the routing rule, a priority of the wireless local area network is higher than a priority of the cellular network, and an address of the wireless local area network is written into the routing rule. The process of controlling, by the routing module, data transmission according to the routing rule is as follows.

Before data transmission, the routing module determines whether a target address of data is the address of the wireless local area network. If the target address is the address of the wireless local area network, the data is transmitted through the wireless local area network. If the target address is not the address of the wireless local area network, the data is transmitted through the cellular network. In an example, if the user chooses not to use the first network, the display driver may also control the electronic device to display the second prompt information. If the user chooses not to use the first network and the user enables the network parallel control setting, the routing module may configure a routing rule, and the routing module controls data transmission according to the routing rule. The routing rule may be that the electronic device may transmit data through two different types of networks at the same time. If the user chooses not to use the first network and the user disables the network parallel control setting, the electronic device may use a second network as a primary network and be disconnected from the first network. In another example, if the user chooses not to use the first network, the electronic device may consider by default that the user has enabled the network parallel control setting, so that the electronic device can transmit data through two different types of networks at the same time.

The communication method may be applied to an Internet of things scenario. The Internet of things scenario may include remote printing, surveillance direct connection, and the like. In a remote printing scenario, electronic devices, such as a mobile phone and a computer, and a printer access a same wireless local area network. The mobile phone or computer may transfer files to the printer through the wireless local area network, and the printer prints the files. In a surveillance direct connection scenario, electronic devices, such as a mobile phone and a computer, and a surveillance device (such as a camera) access a same wireless local area network. Through the wireless local area network, the mobile phone or computer may view videos and pictures captured by the surveillance device, and the mobile phone or computer may further control a working status of the surveillance device. For example, the mobile phone or computer may control the surveillance device to adjust a shooting angle, turn off the surveillance device, turn on the surveillance device, and the like.

Figure 5:
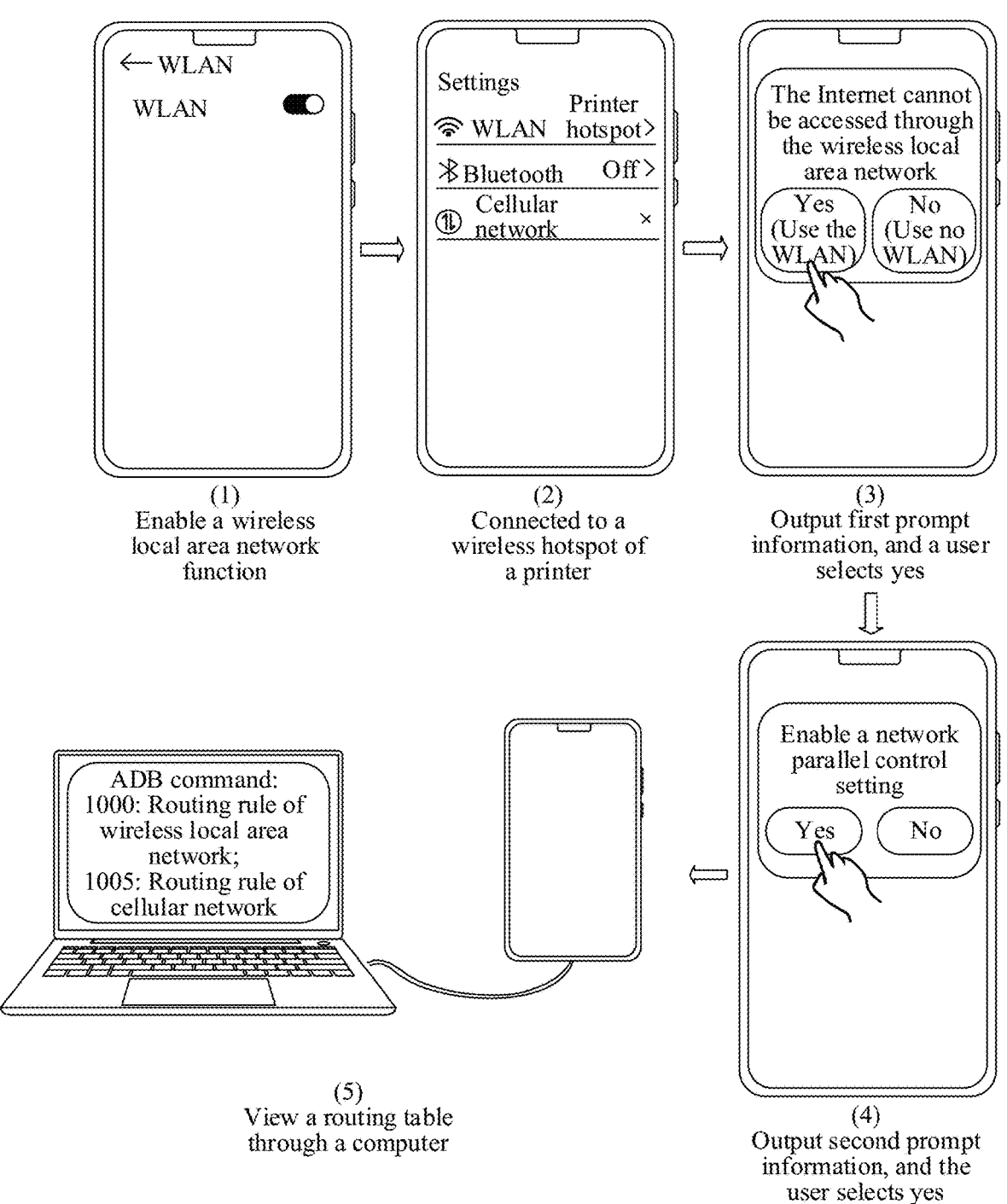
FIG. 5 is a schematic diagram of a communication method according to this application.

In a remote printing scenario, a wireless local area network (expressed as WLAN in FIG. 5) function of an electronic device is enabled, the electronic device detects a nearby wireless local area network and finds a wireless hotspot of a printer, and the electronic device may be connected to the wireless hotspot of the printer. After the electronic device is connected to the wireless hotspot of the printer, the electronic device performs network probing on a wireless local area network corresponding to the wireless hotspot. An objective of network probing is to detect whether the Internet can be accessed through the wireless local area network. If access to the Internet through the wireless local area network fails, the electronic device may output first prompt information, where as shown in FIG. 5, the first prompt information may be "Internet cannot be accessed through this wireless local area network", to indicate whether to continue using the wireless local area network through the first prompt information. If a user feeds back to continue using the wireless local area network, the electronic device may output second prompt information. The second prompt information may be "whether to enable a network parallel control setting". If the user enables the network parallel control setting, the electronic device adjusts a routing rule in a routing table. The routing table may include a routing rule based on the wireless local area network of the printer and a routing rule based on a cellular network. A priority of the routing rule of the wireless local area network is higher than a priority of the routing rule of the cellular network. The routing rule of the wireless local area network includes an address of the wireless local area network.

A manner of viewing the routing table is as follows. If the electronic device is a computer, after the computer receives an ADB (Android Debug Bridge, Android Debug Bridge) command entered by the user, the routing table may be displayed on the computer. If the electronic device is not a computer, the electronic device may be connected to a computer. After the computer receives an ADB command entered by the user, the computer may obtain the routing table of the electronic device and display the routing table.

Because the priority of the routing rule of the wireless local area network is higher than the priority of the routing rule of the cellular network, during data transmission, the electronic device may first call the routing rule of the wireless local area network, and then call the routing rule of the cellular network when the routing rule of the wireless local area network does not match. For example, the electronic device determines whether a target address of to-be-transmitted data is the address of the wireless local area network. If the target address is the address of the wireless local area network, the data is transmitted through the wireless local area network. If the target address is not the address of the wireless local area network, the data is transmitted through the cellular network. Therefore, the electronic device may maintain a connection to the wireless local area network while accessing the cellular network, so that the electronic device can access two different types of networks in two different network access manners, for example, the electronic device may access the wireless local area network and the cellular network at the same time. In addition, the electronic device may access the Internet through the cellular network, and continue to execute a previous service through the wireless local area network, for example, continue to execute the service of remote printing.

Figure 6:
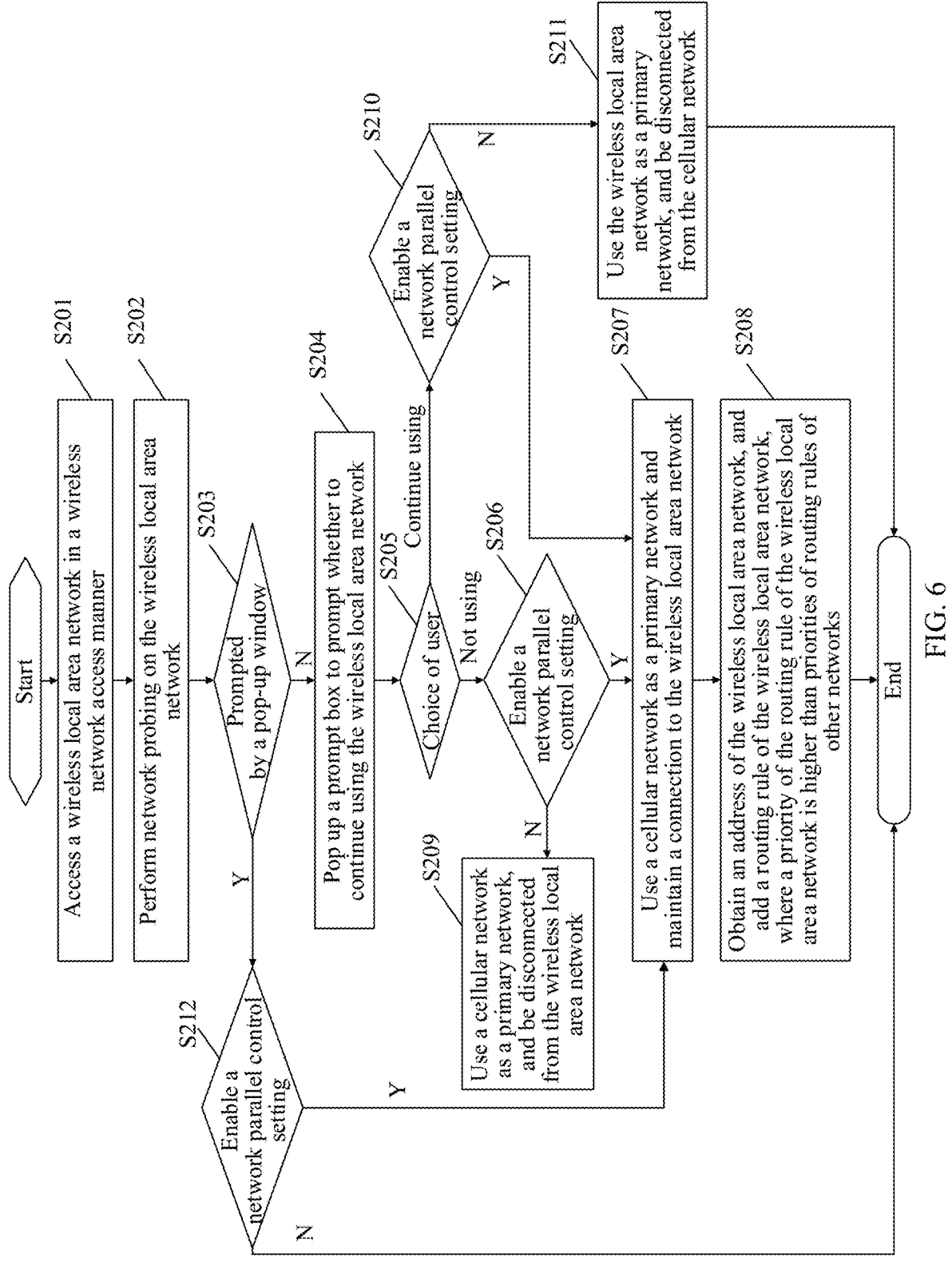
FIG. 6 is a flowchart of another communication method according to this application.

The following describes a communication method provided in this application with reference to a flowchart. FIG. 6 shows an optional process of a communication method provided in this application. The process may include the following steps.

S201. A wireless communication module (for example, a Wi-Fi module) in an electronic device accesses a wireless local area network in a wireless network access manner.

S202. A network management module in the electronic device performs network probing on the wireless local area network. An objective of network probing is to determine whether the Internet can be accessed through the wireless local area network. For example, the network management module may initiate a probe request. The probe request is used to detect whether the Internet can be accessed through the wireless local area network. The probe request may be a hyper text transfer protocol (hyper text transfer protocol, HTTP) request. The form of the HTTP request is not described in the embodiments.

The network management module may receive a status code that matches the probe request and determine whether the Internet can be accessed through the wireless local area network based on the status code. For example, a status code being 200 indicates that a probe succeeds. If the received status code is 200, it is determined that the Internet can be accessed through the wireless local area network. A status code being 400 indicates that a probe fails. If the received status code is 400, it is determined that the Internet cannot be accessed through the wireless local area network.

S203. When it is detected that the Internet cannot be accessed through the wireless local area network, the network management module determines whether the wireless local area network has been prompted by a pop-up window. If no, step S204 is performed; and if yes, step S212 is performed.

The prompt by a pop-up window is used to pop up a prompt box on a display screen. The prompt box is used to prompt a user that the Internet cannot be accessed through the wireless local area network. When it is detected that the Internet cannot be accessed through the wireless local area network, the network management module detects historical prompts by a pop-up window to determine whether there is the prompt by a pop-up window of the wireless local area network in the historical prompts by a pop-up window.

The wireless local area network may be identified by a service set identifier (service set identifier, SSID). Each of the historical prompts by a pop-up window may be identified by the SSID of the wireless local area network to prompt the wireless local area network through which the Internet cannot be accessed by using the SSID. Correspondingly, the network management module may search, based on an SSID of a currently accessed wireless local area network, for a historical prompt by a pop-up window that matches the SSID from the historical prompts by a pop-up window. If there is no historical prompt by a pop-up window that matches the SSID, it is determined that the currently accessed wireless local area network has not been prompted by a pop-up window. If there is a historical prompt by a pop-up window that matches the SSID, it is determined that the currently accessed wireless local area network has been prompted by a pop-up window.

S204. A display drive module drives a display screen to pop up a prompt box to prompt whether to continue using the wireless local area network.

In the embodiments, the network management module has not given a prompt by a pop-up window of the currently accessed wireless local area network. The network management module may indicate the display drive module to drive the display screen to pop up the prompt box, to prompt whether to continue using the wireless local area network. If the user chooses not to use the wireless local area network, the cellular network is used as a primary network, and data is transmitted through at least the cellular network. If the user chooses to use the wireless local area network, the wireless local area network is used as a primary network, and data is transmitted through the wireless local area network.

The content of the prompt box may be that the Internet cannot be accessed through the wireless local area network, to prompt that if the user continues using the wireless local area network, the Internet cannot be accessed. In addition, the prompt box may further display a selection control. For example, the prompt box displays two options "yes" and "no". The user may select one of the two options "yes" and "no" for the user to determine whether to continue using the wireless local area network. An operation by the user on an option may be detected by a touch drive module.

S205. The network management module receives a choice from the user. If the user chooses not to use the wireless local area network, step S206 is performed. If the user chooses to continue using the wireless local area network, step S210 is performed.

S206. The network management module determines whether to enable a network parallel control setting. If yes, step S207 is performed. If no, step S209 is performed. In an example, whether to enable the network parallel control setting may be preset in a setting interface of the electronic device. That is, a setting interface associated with the network parallel control setting is added in the electronic device, the user may enable the network parallel control setting in advance. The network management module obtains a setting result of an option of "network parallel control setting" in the setting interface. In another example, the network management module may indicate the display drive module to drive the display screen to pop up second prompt information, the second prompt information provides a selection control, and the selection control may include two options "yes" and "no". If the user clicks on/taps "yes", it indicates that the user enables the network parallel control setting. If the user clicks on/taps "no", it indicates that the user restricts the network parallel control setting, that is, disables the network parallel control setting. The network management module may determine, based on the choice of the user, whether to enable the network parallel control setting. If the user does not perform an operation on the second prompt information within a specific period of time, it considers by default that the network parallel control setting is enabled.

S207. The network management module uses the cellular network as a primary network and maintains a connection to the wireless local area network.

S208. The network management module obtains an address of the wireless local area network and adds a routing rule of the wireless local area network to a routing table, where a priority of the routing rule of the wireless local area network is higher than priorities of routing rules of other networks. The address of the wireless local area network is written into the routing rule of the wireless local area network. In this case, when a target address indicated by the routing rule of the wireless local area network is the address of the wireless local area network, data is transmitted through the wireless local area network.

The routing rules of other networks may include a routing rule of the cellular network, a routing rule of a Bluetooth network, and the like. The priority of the routing rule of the wireless local area network is higher than the priorities of the routing rules of these networks. The network management module may first call the routing rule of the wireless local area network when calling routing rules.

S209. The network management module uses the cellular network as a primary network and is disconnected from the wireless local area network, so that the electronic device can transmit data through the cellular network.

S210. The network management module determines whether to enable a network parallel control setting. If yes, step S207 is performed. If no, step S211 is performed.

S211. The network management module uses the wireless local area network as a primary network and is disconnected from the cellular network, so that the electronic device can transmit data through the wireless local area network.

S212. The network management module determines whether to enable the network parallel control setting. If yes, step S207 is performed. If no, the process ends.

After the network parallel control setting of the network management module is enabled, regardless of whether the user chooses to continue using the wireless local area network or chooses not to use the wireless local area network, the network management module may add a routing rule of the wireless local area network to the routing table. A priority of the routing rule of the wireless local area network is higher than priorities of routing rules of other networks. The reason why the priority of the routing rule of the wireless local area network is set higher is that a routing rule with a higher priority can be first selected. The network management module may control the wireless communication module to transmit data according to the first selected routing rule. If the routing rule of the cellular network is higher than the routing rule of the wireless local area network, data transmitted to the wireless local area network is intercepted and then transmitted through the cellular network, so that the data originally transmitted to the address of the wireless local area network is intercepted and transmitted by the cellular network, resulting in data transmission failure.

In the embodiments, when the network management module in the electronic device uses the cellular network as a primary network, in addition to the routing rule of the wireless local area network, there is also a routing rule of the cellular network set in the routing table after the routing rule of the wireless local area network. The routing rule of the cellular network does not indicate a target address. If a target address of to-be-transmitted data is the address of the wireless local area network, the electronic device may select the routing rule of the wireless local area network and transmit data through the wireless local area network. If the target address of the to-be-transmitted data is not the address of the wireless local area network, the electronic device does not select the routing rule of the wireless local area network and continues to match other routing rules, for example, match the routing rule of the cellular network. The electronic device may select the routing rule of the cellular network and transmit data through the cellular network.

For example, in a remote printing scenario, the address of the wireless local area network may be an address of a printer. If a target address of to-be-transmitted data is the address of the printer, the electronic device may continue to transmit data to the printer through the wireless local area network and continue to print files by using the printer. In addition, the electronic device may be further connected to the cellular network and access the Internet through the cellular network, to implement normal access to the Internet through the cellular network and data transmission through the wireless local area network at the same time. Therefore, the electronic device can implement, based on a network status (accessible to the Internet or not), concurrency of the wireless local area network, through which the Internet cannot be accessed, and the cellular network according to the routing rule, thereby improving network communication experience when a device providing a wireless local area network is directly connected.

The concurrency may be the capability to transmit data through the wireless local area network and access the Internet through the cellular network at the same time. In addition, data can be continuously sent to the address of the wireless local area network, meanwhile, the Internet can be accessed, so that the two communication requirements are satisfied, thereby passing network communication experience. In the embodiments, if an application needs to access the Internet and also needs to transmit data through the wireless local area network, the two requirements of the application can be satisfied by using the communication method provided in the embodiments.

Figure 7A:
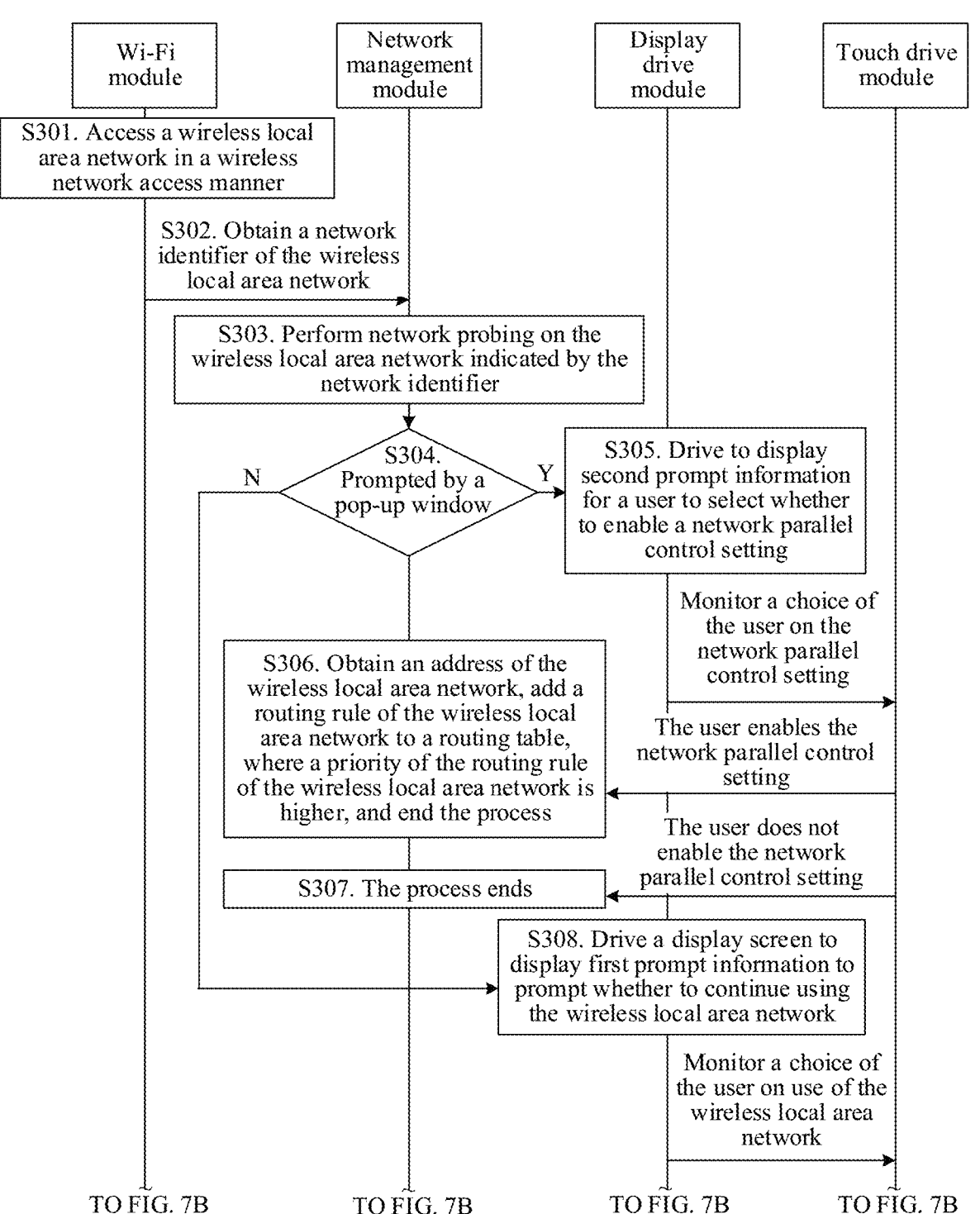
FIG. 7A and FIG. 7B are a sequence diagram of a communication method according to this application.
Figure 7B:
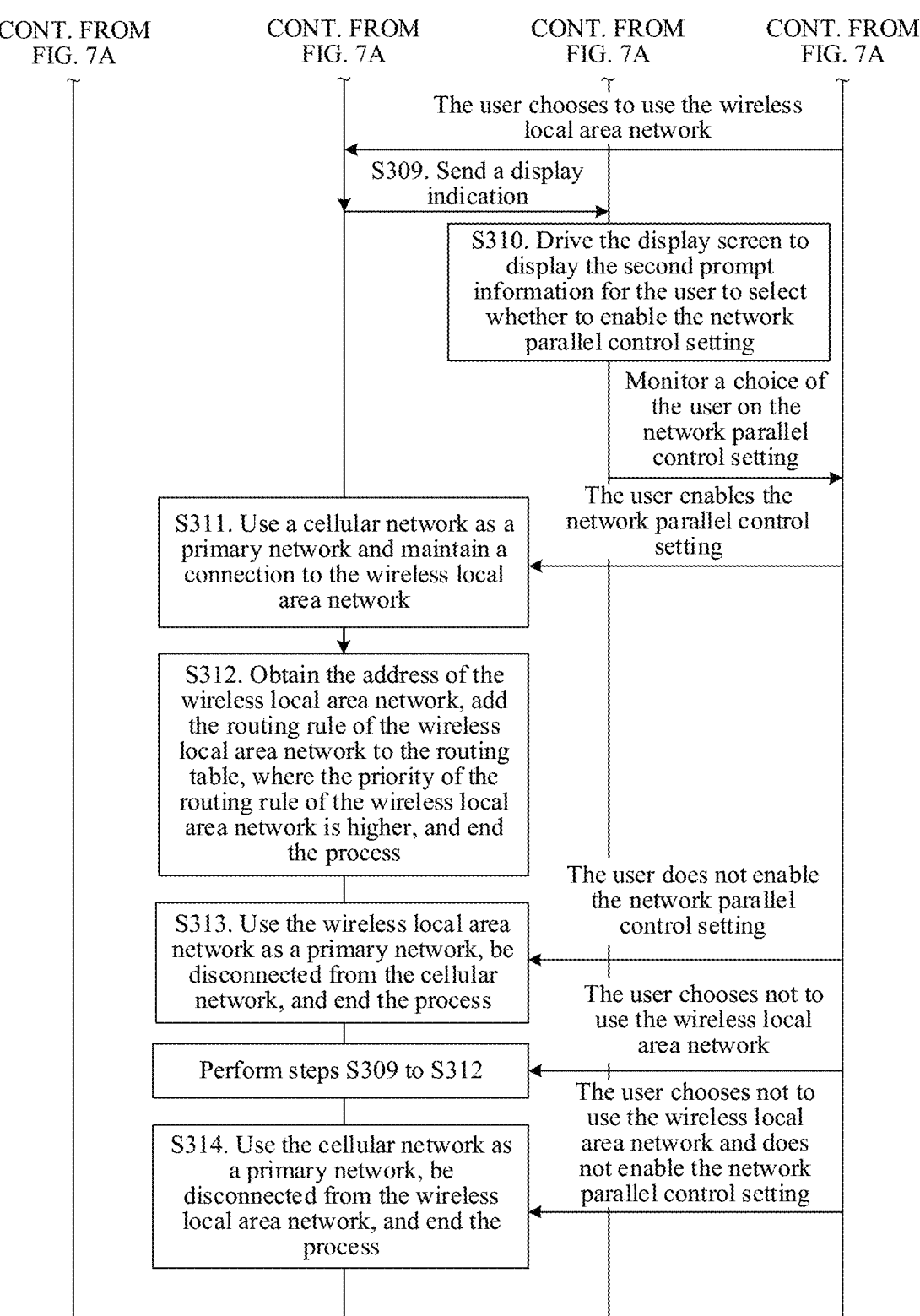

Correspondingly, FIG. 7A and FIG. 7B are a sequence diagram including a Wi-Fi module, a network management module, a display drive module, and a touch drive module, which may include the following steps.

S301. The Wi-Fi module accesses a wireless local area network in a wireless network access manner.

S302. The network management module obtains a network identifier of the wireless local area network.

S303. The network management module performs network probing on the wireless local area network indicated by the network identifier.

S304. When it is detected that the Internet cannot be accessed through the wireless local area network, the network management module determines whether the wireless local area network has been prompted by a pop-up window. If yes, step S305 is performed, to indicate the display drive module to drive a display screen to display second prompt information. If no, step S308 is performed, to indicate the display drive module to drive the display screen to display first prompt information.

S305. The display drive module drives the display screen to display the second prompt information. The second prompt information may be a prompt box, to prompt a user to enable a network parallel control setting. In addition to prompting the user to enable the network parallel control setting, the second prompt information further provides a selection control. By using the selection control, the user may enable the network parallel control setting or disable the network parallel control setting.

For example, as shown in FIG. 5(4), the selection control may include two options "yes" and "no". If the user clicks on/taps "yes", it indicates that the user enables the network parallel control setting. If the user clicks on/taps "no", it indicates that the user disables the network parallel control setting. In the embodiments, the pop-up of the second prompt information has a time limit. If the user does not perform an operation on the selection control in the second prompt information within the time limit, it considers by default that the user has enabled the network parallel control setting.

A selection result of the user on the second prompt information may be monitored by the touch drive module, and then the touch drive module sends the selection result on the second prompt information to the network management module.

S306. After determining that the selection result on the second prompt information is enabling the network parallel control setting, the network management module obtains an address of the wireless local area network and adds a routing rule of the wireless local area network to a routing table, where a priority of the routing rule of the wireless local area network is higher than priorities of routing rules of other networks. The address of the wireless local area network is written into the routing rule of the wireless local area network. In this case, when a target address indicated by the routing rule of the wireless local area network is the address of the wireless local area network, data is transmitted through the wireless local area network.

S307. After the network management module determines that the selection result of the second prompt information is disabling the network parallel control setting, the process ends.

S308. The display drive module drives the display screen to display the first prompt information. The first prompt information may be a prompt box, to prompt whether to continue using the wireless local area network. In addition to prompting the user to enable the network parallel control setting, the first prompt information further provides a selection control. By using the selection control, the user may choose to continue using the wireless local area network or not to use the wireless local area network.

For example, as shown in FIG. 5(3), the selection control may include two options "yes" and "no". If the user clicks on/taps "yes", it indicates that the user continues to use the wireless local area network. If the user clicks on/taps "no", it indicates that the user does not use the wireless local area network. In the embodiments, the pop-up of the first prompt information has a time limit. If the user does not perform an operation on the selection control in the first prompt information within the time limit, it considers by default that the user does not use the wireless local area network. Similarly, a selection result of the user on the first prompt information may be monitored by the touch drive module, and then the touch drive module sends the selection result on the first prompt information to the network management module.

S309. After determining that the selection result on the first prompt information is to continue using the wireless local area network, the network management module indicates the display drive module to drive the display screen to display the second prompt information.

S310. The display drive module drives the display screen to display the second prompt information.

S311. After determining that the selection result on the second prompt information is enabling the network parallel control setting, the network management module uses the cellular network as a primary network and maintains a connection to the wireless local area network.

S312. The network management module obtains an address of the wireless local area network and adds a routing rule of the wireless local area network to a routing table, where a priority of the routing rule of the wireless local area network is higher than a priority of a routing rule of another network. The address of the wireless local area network is written into the routing rule of the wireless local area network. In this case, when a target address indicated by the routing rule of the wireless local area network is the address of the wireless local area network, data is transmitted through the wireless local area network.

S313. After determining that the selection result on the second prompt information is disabling the network parallel control setting, the network management module uses the wireless local area network as a primary network and is disconnected from the cellular network, so that the electronic device can transmit data through the wireless local area network.

If the user chooses not to use the wireless local area network, the network management module may perform step S309 to step S312. After the user chooses not to use the wireless local area network, the display drive module is indicated to drive the display screen to display the second prompt information. After determining that the selection result on the second prompt information is enabling the network parallel control setting, the network management module uses the cellular network as a primary network and maintains a connection to the wireless local area network, obtains an address of the wireless local area network, and adds a routing rule of the wireless local area network to a routing table, where a priority of the routing rule of the wireless local area network is higher than priorities of routing rules of other networks. The address of the wireless local area network is written into the routing rule of the wireless local area network. In this case, when a target address indicated by the routing rule of the wireless local area network is the address of the wireless local area network, data is transmitted through the wireless local area network.

If the user chooses not to use the wireless local area network and does not enable the network parallel control setting, the network management module may perform step S314, to use the cellular network as a primary network and be disconnected from the wireless local area network, and the process ends.

After the electronic device adds the routing rule of the wireless local area network to the routing table based on the communication method above, during data transmission, the electronic device first determines whether currently transmitted data conforms to the routing rule of the wireless local area network. If the data conforms to the routing rule of the wireless local area network, the data is transmitted through the wireless local area network. If the currently transmitted data does not conform to the routing rule of the wireless network router, the electronic device determines whether the currently transmitted data conforms to a routing rule of another network. A priority of the routing rule of another network is lower than the priority of the routing rule of the wireless local area network. If the data conforms to the routing rule of another network, the data is transmitted through the another network.

For example, during data transmission, the electronic device determines whether a target address of currently transmitted data is the address of the wireless local area network. If the target address is the address of the wireless local area network, the data is transmitted through the wireless local area network. If the target address is not the address of the wireless local area network, the electronic device determines whether the currently transmitted data conforms to the routing rule of the cellular network. If the data conforms to the routing rule of the cellular network, the data is transmitted through the cellular network.

In addition, the electronic device may further obtain a network interface card name. When transmitting data through the wireless local area network, the electronic device may transmit data by using a network interface card corresponding to the network interface card name. The network interface card name may be added to the routing rule of the wireless local area network, to indicate that data is transmitted by using the network interface card corresponding to the network interface card name. An address of a network interface card may also be added to the routing rule of the wireless local area network. The address of the network interface card may be a Media Access Control address (Media Access Control Address, MAC address). Data is transmitted by using a network interface card with the address.

In the embodiments, the electronic device may adjust the routing table based on the change of a network status, mainly adjusting the routing rule in the routing table based on the change of the network status. An adjustment manner is as follows. When a connection to the wireless local area network is broken or the Internet can be accessed through the wireless local area network, the routing rule of the wireless local area network is deleted. If the Internet cannot be accessed through the wireless local area network, and the user enables the network parallel control setting, the electronic device may continue to add the routing rule of the wireless local area network to the routing table, so that all routing rules in the routing table match currently available networks, reducing routing rules that are not associated with the current networks in the routing table, and reducing memory usage of the routing table. For example, if a connection to the wireless local area network is broken, that is, the currently available networks of the electronic device do not include the wireless local area network, the routing rule of the wireless local area network is an irrelevant routing rule, and the electronic device can delete the routing rule, to reduce a quantity of the routing rules in the routing table, thereby reducing memory usage of the routing table.

Figure 8:
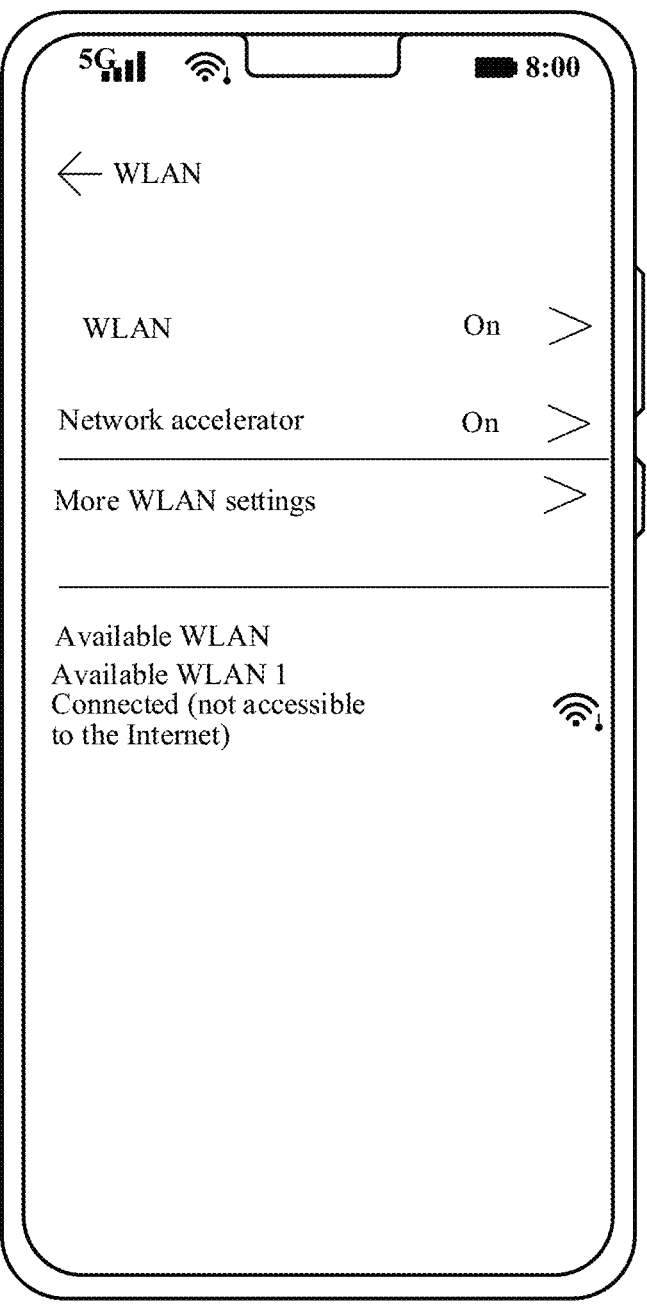
FIG. 8 is a schematic diagram of a network connection according to this application.
Figure 9:
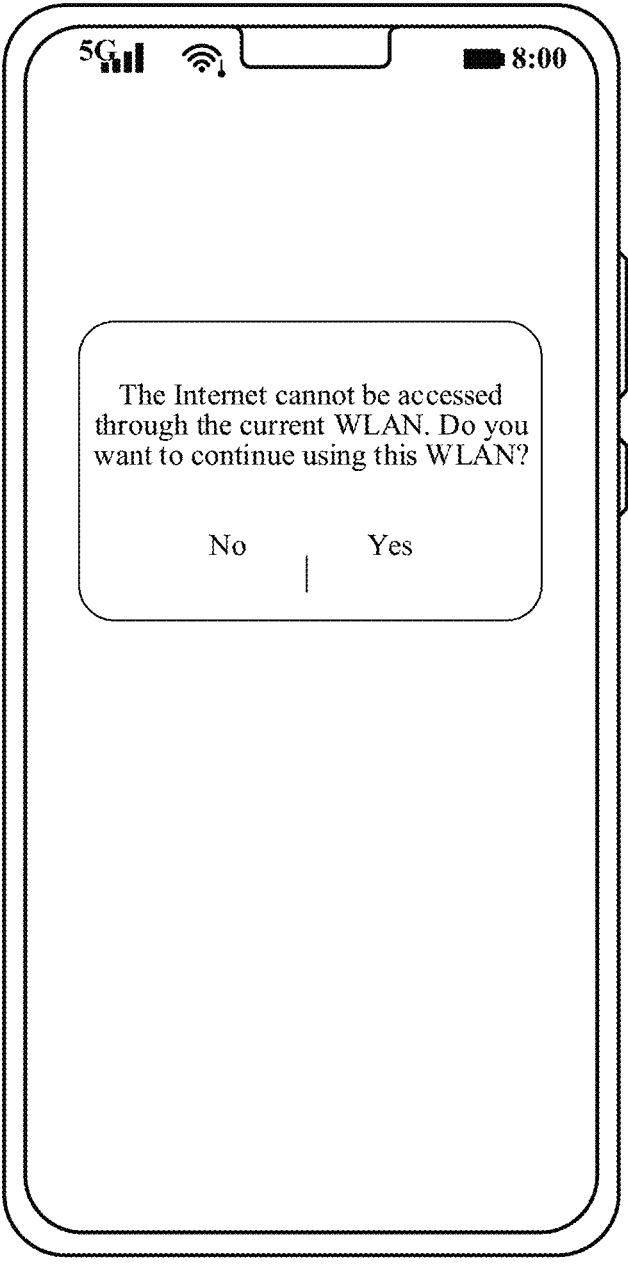
FIG. 9 is a schematic diagram of a prompt according to this application.

The communication method provided in the embodiments is described below by using an example. As shown in FIG. 8, an electronic device is connected to an available wireless local area network (WLAN). The available wireless local area network corresponds to a wireless hotspot of a printer, and the Internet cannot be accessed through the available wireless local area network. In this case, a network management module in the electronic device may detect that the Internet cannot be accessed through the wireless local area network, and then the network management module may indicate a display drive module in the electronic device to drive a display screen to output prompt information. For example, the display drive module drives the display screen to display the prompt information shown in FIG. 9. The prompt information may indicate that the Internet cannot be accessed through the currently connected wireless local area network and whether to continue using the wireless local area network. There are two selections in the prompt information, one is not using, and the other is using. Not using indicates that the wireless local area network is not used, and using indicates that the wireless local area network is still used.

If a user chooses not to use the wireless local area network, a touch drive module in the electronic device may send a selection result of the user to the network management module. After receiving the selection result of the user, the network management module obtains whether the user enables a network parallel control setting, for example, obtains the setting result of whether the user enables the network parallel control setting from a setting interface. If the user disables the network parallel control setting, the electronic device may use the following routing table. The following routing table is obtained under the "HNELZ:/#ip rule show" command.

HNELZ:/#ip rule show
0: from all lookup local
10000: from all fwmark 0xc0000/0xd0000 lookup legacy_system
11000: from all iif lo 0if dummy0 uidrange 0-0 lookup dummy0
11000: from all iif lo 0if rmnet_data0 uidrange 0-0 lookup rmnet_data0
11000: from all iif lo 0if rmnet_data1 uidrange 0-0 lookup rmnet_data1
11000: from all iif lo 0if rmnet_data2 uidrange 0-0 lookup rmnet_data2
11000: from all iif lo 0if wlan0 uidrange 0-0 lookup wlan0
16000: from all fwmark 0x10063/0x1ffff iif lo lookup local_network
16000: from all fwmark 0xd0001/0xdffff iif lo lookup rmnet_data0
16000: from all fwmark 0xd0064/0xdffff iif lo lookup rmnet_data1
16000: from all fwmark 0x10065/0x1ffff iif lo lookup rmnet_data2
16000: from all fwmark 0x10069/0x1ffff iif lo lookup wlan0
17000: from all iif lo 0if dummy0 lookup dummy0
17000: from all fwmark 0xc0000/0xc0000 iif lo 0if rmnet_data0 lookup rmnet_data0
17000: from all fwmark 0xc0000/0xc0000 iif lo 0if rmnet_data1 lookup rmnet_data1
17000: from all iif lo 0if rmnet_data2 lookup rmnet_data2
17000: from all iif lo 0if wlan0 lookup wlan0
18000: from all fwmark 0x0/0x10000 lookup legacy_system
19000: from all fwmark 0x0/0x10000 lookup legacy_network
20000: from all fwmark 0x0/0x10000 lookup local_network
23000: from all fwmark 0x65/0x1ffff iif lo lookup rmnet_data2
23000: from all fwmark 0x69/0x1ffff iif lo lookup wlan0
29000: from all lookup default
29000: from all fwmark 0x0/0xffff iif lo lookup rmnet_data2
31000: from all lookup main
32000: from all unreachable It can be learned from the foregoing routing table that priorities of the cellular networks (rmnet_data0 to rmnet_data2) are higher than a priority of the wireless local area network (wlan0). For example, in the routing rule 11000 of the foregoing routing table, the priorities of rmnet_data0 to rmnet_data2 are higher than the priority of wlan0. In this case, during data transmission, the electronic device first determines whether currently transmitted data matches the routing rule of the cellular network. If the data matches the routing rule of the cellular network, the data is transmitted through the cellular network. If the data matches the routing rule of the wireless local area network (such as wlan0 in 11000 and wlan0 in 16000), as a connection to the wireless local area network is broken, the data cannot be transmitted through the wireless local area network. For example, after the electronic device is disconnected from the wireless local area network, the electronic device is disconnected from the hotspot of the printer, and data to be sent to the printer cannot be transmitted to the printer.

To resolve the problem that the data cannot transmitted to the printer, the communication method provided in the embodiments may provide a control policy. Specifically, the user enables a network parallel control setting while using the wireless local area network. By enabling the network parallel control setting, the electronic device can be connected to the wireless local area network and the cellular network at the same time, where a priority of a routing rule of the wireless local area network is higher than a priority of a routing rule of the cellular network. The routing rule is as follows.

HNELZ:/#ip rule show
0: from all lookup local
100: from all to 192.168.104.0/24 lookup 100
10000: from all fwmark 0xc0000/0xd0000 lookup legacy_system
11000: from all iif lo 0if dummy0 uidrange 0-0 lookup dummy0
11000: from all iif lo 0if rmnet_data0 uidrange 0-0 lookup rmnet_data0
11000: from all iif lo 0if rmnet_data1 uidrange 0-0 lookup rmnet_data1
11000: from all iif lo 0if rmnet_data2 uidrange 0-0 lookup rmnet_data2
11000: from all iif lo 0if wlan0 uidrange 0-0 lookup wlan0
16000: from all fwmark 0x10063/0x1ffff iif lo lookup local_network
16000: from all fwmark 0xd0001/0xdffff iif lo lookup rmnet_data0
16000: from all fwmark 0xd0064/0xdffff iif lo lookup rmnet_data1
16000: from all fwmark 0x1006c/0x1ffff iif lo lookup rmnet_data2
16000: from all fwmark 0x1006d/0x1ffff iif lo lookup wlan0
17000: from all iif lo 0if dummy0 lookup dummy0
17000: from all fwmark 0xc0000/0xc0000 iif lo 0if rmnet_data0 lookup rmnet_data0
17000: from all fwmark 0xc0000/0xc0000 iif lo 0if rmnet_data1 lookup rmnet_data1
17000: from all iif lo 0if rmnet_data2 lookup rmnet_data2
17000: from all iif lo 0if wlan0 lookup wlan0
18000: from all fwmark 0x0/0x10000 lookup legacy_system
19000: from all fwmark 0x0/0x10000 lookup legacy_network
20000: from all fwmark 0x0/0x10000 lookup local_network 23000: from all fwmark 0x6c/0x1ffff iif lo lookup rmnet_data2

23000: from all fwmark 0x6d/0x1ffff iif lo lookup wlan0

29000: from all lookup default

29000: from all fwmark 0x0/0xffff iif lo lookup rmnet_data2

31000: from all lookup main

32000: from all unreachable

The routing rule of 100 is 192.168.104.0/24 dev wlan0 proto static, and can be obtained through the command HNELZ://#ip route show table 100. The routing rule indicates that the data whose target address is 192.168.104.0/24 can be transmitted through the wireless local area network-wlan0. The target address 192.168.104.0/24 is the address of the printer. That is, the data sent to the printer can still be transmitted through the wireless local area network. The data that does not match the routing rule of 100 may continue to be matched with the routing rule of the cellular network. If the data that does not match the routing rule of 100 matches the routing rule of the cellular network, the data may be transmitted through the cellular network.

Figure 10:
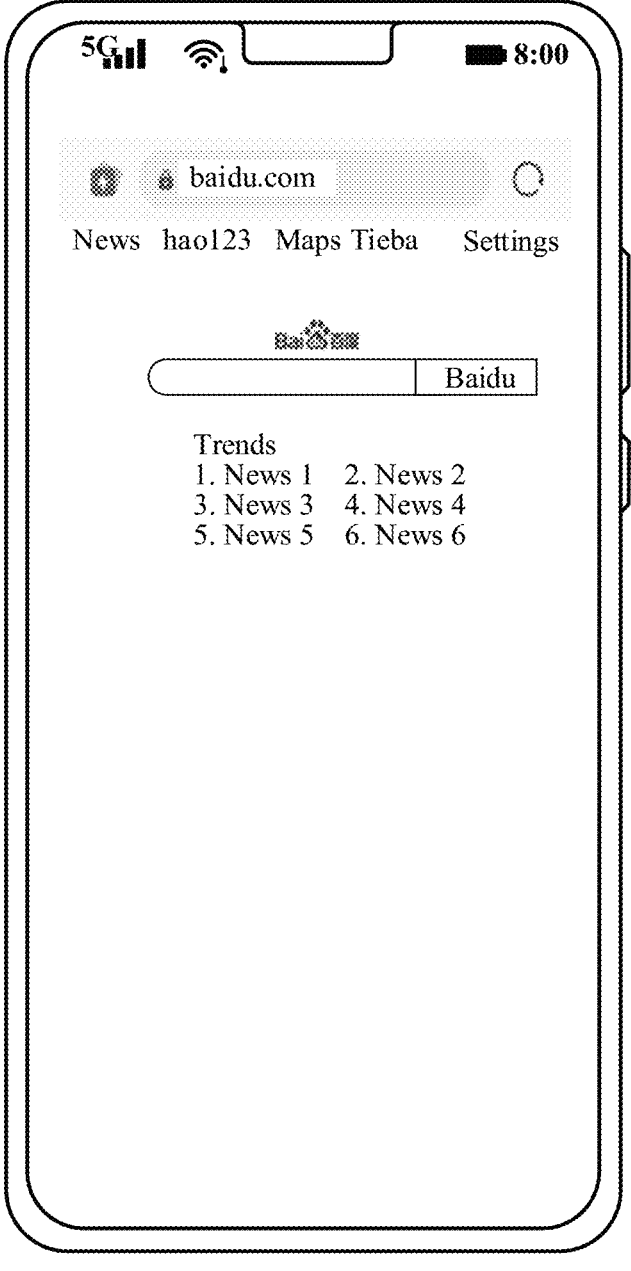
FIG. 10 is a schematic diagram of successful Internet access according to this application.

In an example, as shown in FIG. 10, an electronic device initiates a request for access to the Internet, and an address in the request is not the address of the printer, so that the request for access to the Internet does not match the routing rule of the wireless local area network. The request for access to the Internet may continue to be matched with another routing rule, for example, the routing rule of rmnet_data0 in 11000. The routing rule of rmnet_data0 is the routing rule of the cellular network. When being connected to the cellular network, the electronic device may access the Internet through the cellular network. Therefore, the request for access to the Internet can match the routing rule of rmnet_data0, to access the Internet through the cellular network. In this case, the user enables the network parallel control setting while using the wireless local area network, so that the electronic device can send data to the printer, and can also access the Internet at the same time.

However, if the user disables the network parallel control setting while using the wireless local area network, through the network parallel control setting, the electronic device can be connected to the wireless local area network but be disconnected from the cellular network. The corresponding routing rule is as follows.

HNELZ://#ip rule show

0: from all lookup local

10000: from all fwmark 0xc0000/0xd0000 lookup legacy_system

11000: from all iif lo 0if dummy0 uidrange 0-0 lookup dummy0

11000: from all iif lo 0if rmnet_data0 uidrange 0-0 lookup rmnet_data0

11000: from all iif lo 0if rmnet_data1 uidrange 0-0 lookup rmnet_data1

11000: from all iif lo 0if rmnet_data2 uidrange 0-0 lookup rmnet_data2

11000: from all iif lo 0if wlan0 uidrange 0-0 lookup wlan0

16000: from all fwmark 0x10063/0x1ffff iif lo lookup local_network

16000: from all fwmark 0xd0001/0xdffff iif lo lookup rmnet_data0

16000: from all fwmark 0xd0064/0xdffff iif lo lookup rmnet_data1

16000: from all fwmark 0x10065/0x1ffff iif lo lookup rmnet_data2

16000: from all fwmark 0x10069/0x1ffff iif lo lookup wlan0

17000: from all iif lo 0if dummy0 lookup dummy0

17000: from all fwmark 0xc0000/0xc0000 iif lo 0if rmnet_data0 lookup rmnet_data0

17000: from all fwmark 0xc0000/0xc0000 iif lo 0if rmnet_data1 lookup rmnet_data1

17000: from all iif lo 0if rmnet_data2 lookup rmnet_data2

17000: from all iif lo 0if wlan0 lookup wlan0

18000: from all fwmark 0x0/0x10000 lookup legacy_system

19000: from all fwmark 0x0/0x10000 lookup legacy_network

20000: from all fwmark 0x0/0x10000 lookup local_network

23000: from all fwmark 0x65/0x1ffff iif lo lookup rmnet_data2

23000: from all fwmark 0x69/0xffff iif lo lookup wlan0

29000: from all lookup default

29000: from all fwmark 0x0/0xffff iif lo lookup rmnet_data2

31000: from all lookup main

32000: from all unreachable

Figure 11:
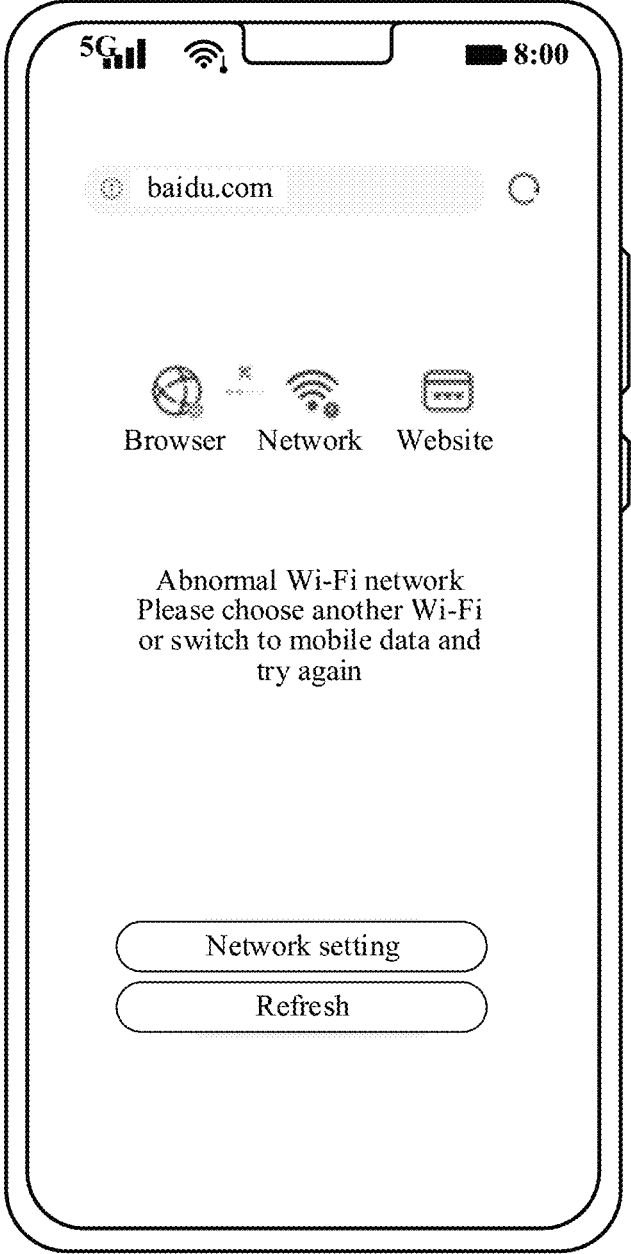
FIG. 11 is a schematic diagram of failed Internet access according to this application.

Based on this routing table, if the electronic device initiates a request for access to the Internet, the request for access to the Internet is first matched with the routing rule of the cellular network. As the electronic device is disconnected from the cellular network, the request for access to the Internet does not match the routing rule of the cellular network. The electronic device continues to match the request for access to the Internet with the routing rule of the wireless local area network. The request for access to the Internet matches the routing rule of the wireless local area network, but the Internet cannot be accessed through the wireless local area network. Consequently, the request for access to the Internet fails to be sent, showing the access result on the electronic device in FIG. 11.

Some embodiments of this application further provide an electronic device. The electronic device may include one or more processors, and a memory. The memory is configured to store one or more computer program codes. The one or more computer program codes include computer instructions. When the one or more processors execute the computer instructions, the electronic device performs the method above.

The embodiments further provide a computer-readable storage medium. The computer-readable storage medium includes instructions. When the instructions are run on an electronic device, the electronic device performs the method above.

The embodiments further provide a computer program product including instructions. When the computer program product is run on an electronic device, the electronic device performs the method above.

The embodiments further provide a control device. The control device includes one or more processors, and a memory. The memory is configured to store one or more computer program codes. The one or more computer program codes include computer instructions. When the one or more processors execute the computer instructions, the control device performs the method above. The control device may be an integrated circuit IC, or may be a system-on-chip SOC. The integrated circuit may be a general-purpose integrated circuit, or may be a field programmable gate array FPGA, or may be an application-specific integrated circuit ASIC.

Through the description of the foregoing implementations, a person skilled in the art may clearly understand that, for the purpose of convenient and brief description, only division of the foregoing functional modules is used as an example for description. In a practical application, the functions may be allocated to and completed by different functional modules according to requirements. That is, an internal structure of the apparatus is divided into different functional modules, to complete all or some of the functions described above. For specific working processes of the system, the apparatus, and the unit described above, refer to the corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, the module or unit division is merely logical function division and may be other division during actual implementation. For example, a plurality of units or components may be combined or integrated into another system, or some features may be omitted or not performed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and the components displayed as units may or may not be physical units, may be located in one position, or may be distributed on a plurality of network units. Some or all of the units may be selected according to an actual requirement to achieve the objectives of the solutions in the embodiments.

In addition, the functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments essentially, or the part contributing to the related art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments. The storage medium includes: any medium that can store program code, such as a flash memory, a removable hard disk, a read-only memory, a random access memory, a magnetic disk, or a compact disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, comprising:
accessing, by a first electronic device, a wireless local area network provided by a second electronic device, wherein the first electronic device cannot access the Internet through the wireless local area network provided by the second electronic device, and the first electronic device accesses the Internet through a cellular network;
generating, by the first electronic device, a data transmission request;
performing the following:
  sending the data transmission request to the second electronic device through the wireless local area network in a case that a target address of the data transmission request is an address of the second electronic device; or
  sending the data transmission request through the cellular network in a case that a target address of the data transmission request is not an address of the second electronic device;
in a case that a network parallel control setting of the first electronic device is disabled, in response to a first operation of a user, accessing, by the first electronic device, the cellular network, and breaking the connection to the wireless local area network; and
in a case that the network parallel control setting of the first electronic device is disabled, in response to a second operation of the user, accessing, by the first electronic device, the wireless local area network, and breaking a connection to the cellular network.

2. The method according to claim 1, further comprising:
displaying, based on the Internet cannot be accessed through the wireless local area network, a first interface, wherein the first interface comprises a first prompt information, and the first prompt information indicates whether to continue using the wireless local area network, and
displaying, when the user feeds back to continue using the wireless local area network, a second interface, wherein the second interface comprises a second prompt information, and the second prompt information whether to enable the network parallel control setting, and
receiving an operation of enabling the network parallel control setting.

3. The method according to claim 1, further comprising:
adding, in response to enabling of the network parallel control setting by the user, a routing rule of the wireless local area network to a routing rule of the first electronic device, wherein a priority of the routing rule of the wireless local area network is higher than a priority of a routing rule of the cellular network, and the routing rule of the wireless local area network comprises a condition for transmitting the data transmission request through the wireless local area network.

4. The method according to claim 1, wherein an identifier of a network device or an address of the network device is recorded in a routing rule of the wireless local area network, and the first electronic device sends the data transmission request to the second electronic device through the network device indicated by the identifier of the network device or the address of the network device.

5. The method according to claim 1, further comprising:
sending a probe request through the wireless local area network;
receiving a status code through the wireless local area network; and
in a case that the status code indicates that the Internet cannot be accessed through the wireless local area network, and the network parallel control setting of the first electronic device is enabled, accessing, by the first electronic device, the cellular network, and maintaining a connection to the wireless local area network.

6. The method according to claim 5, further comprising: displaying, by the first electronic device in a case that the status code indicates that the Internet cannot be accessed through the wireless local area network, a prompt box;

determining, by the first electronic device in response to a third operation of a user, that the network parallel control setting is enabled; and determining, by the first electronic device in response to a fourth operation of the user, that the network parallel control setting is disabled.

7. The method according to claim 5, further comprising: searching, by the first electronic device in a case that the status code indicates that the Internet cannot be accessed through the wireless local area network, for a setting result of the network parallel control setting in a setting interface, wherein the setting result indicates that the network parallel control setting of the first electronic device is enabled or disabled.

8. The method according to claim 1, further comprising: deleting a routing rule of the wireless local area network from a routing rule of the first electronic device in a case that the first electronic device breaks the connection to the wireless local area network; and adding the routing rule of the wireless local area network to the routing rule of the first electronic device in a case that the first electronic device re-accesses the wireless local area network and the network parallel control setting is enabled.

9. An electronic device, comprising:

a memory and a processor, wherein the memory stores instructions executable by the processor, and when the processor executes the instructions, the electronic device is caused to:

access a wireless local area network provided by a second electronic device, wherein the electronic device cannot access the Internet through the wireless local area network provided by the second electronic device, and the electronic device accesses the Internet through a cellular network;

generate a data transmission request;

perform the following:

send the data transmission request to the second electronic device through the wireless local area network in a case that a target address of the data transmission request is an address of the second electronic device; or send the data transmission request through the cellular network in a case that a target address of the data transmission request is not an address of the second electronic device;

in a case that a network parallel control setting of the electronic device is disabled, in response to a first operation of a user, access the cellular network, and break the connection to the wireless local area network; and in a case that the network parallel control setting of the electronic device is disabled, in response to a second operation of the user, access the wireless local area network, and break a connection to the cellular network.

10. The electronic device according to claim 9, wherein when the processor executes the instructions, the electronic device is further caused to:

display, based on the Internet cannot be accessed through the wireless local area network, a first interface, wherein the first interface comprises a first prompt information, and the first prompt information indicates whether to continue using the wireless local area network, display when the user feeds back to continue using the wireless local area network, a second interface, wherein the second interface comprises a second prompt information, and the second prompt information whether to enable the network parallel control setting, and receive an operation of enabling the network parallel control setting.

11. The electronic device according to claim 9, wherein when the processor executes the instructions, the electronic device is further caused to:

add, in response to enabling of the network parallel control setting by the user, a routing rule of the wireless local area network to a routing rule of the electronic device, wherein a priority of the routing rule of the wireless local area network is higher than a priority of a routing rule of the cellular network, and the routing rule of the wireless local area network comprises a condition for transmitting the data transmission request through the wireless local area network.

12. The electronic device according to claim 9, wherein an identifier of a network device or an address of the network device is recorded in a routing rule of the wireless local area network, and the electronic device sends the data transmission request to the second electronic device through the network device indicated by the identifier of the network device or the address of the network device.

13. The electronic device according to claim 9, wherein when the processor executes the instructions, the electronic device is further caused to:

send a probe request through the wireless local area network;

receive a status code through the wireless local area network; and in a case that the status code indicates that the Internet cannot be accessed through the wireless local area network, and the network parallel control setting of the electronic device is enabled, access the cellular network, and maintain a connection to the wireless local area network.

14. The electronic device according to claim 13, wherein when the processor executes the instructions, the electronic device is further caused to:

display, in a case that the status code indicates that the Internet cannot be accessed through the wireless local area network, a prompt box;

determine, in response to a third operation of the user, that a network parallel control setting is enabled; and determine, in response to a fourth operation of the user, that the network parallel control setting is disabled.

15. The electronic device according to claim 13, wherein when the processor executes the instructions, the electronic device is further caused to:

search, in a case that the status code indicates that the Internet cannot be accessed through the wireless local area network, for a setting result of the network parallel control setting in a setting interface, wherein the setting result indicates that the network parallel control setting of the electronic device is enabled or disabled.

16. The electronic device according to claim 9, wherein when the processor executes the instructions, the electronic device is further caused to:

delete a routing rule of the wireless local area network from a routing rule of the electronic device in a case that the electronic device breaks the connection to the wireless local area network; and add the routing rule of the wireless local area network to the routing rule of the electronic device in a case that the electronic device re-accesses the wireless local area network and the network parallel control setting is enabled.

17. A non-transitory computer-readable storage medium, storing a computer program, wherein the computer program, when run by a processor of an electronic device, causes the electronic device to:

access a wireless local area network provided by a second electronic device, wherein the electronic device cannot access the Internet through the wireless local area network provided by the second electronic device, and the electronic device accesses the Internet through a cellular network;

generate a data transmission request; and perform the following:

send the data transmission request to the second electronic device through the wireless local area network in a case that a target address of the data transmission request is an address of the second electronic device; or send the data transmission request through the cellular network in a case that a target address of the data transmission request is not an address of the second electronic device;

in a case that a network parallel control setting of the electronic device is disabled, in response to a first operation of a user, access the cellular network, and break the connection to the wireless local area network; and in a case that the network parallel control setting of the electronic device is disabled, in response to a second operation of the user, access the wireless local area network, and break a connection to the cellular network.

18. The non-transitory computer-readable storage medium according to claim 17, wherein when the computer program is run by the processor of the electronic device, the computer program causes the electronic device to further:

display, based on the Internet cannot be accessed through the wireless local area network, a first interface, wherein the first interface comprises a first prompt information, and the first prompt information indicates whether to continue using the wireless local area network, display when the user feeds back to continue using the wireless local area network, a second interface, wherein the second interface comprises a second prompt information, and the second prompt information whether to enable the network parallel control setting, and receive an operation of enabling the network parallel control setting.

19. The non-transitory computer-readable storage medium according to claim 17, wherein when the computer program is run by the processor of the electronic device, the computer program causes the electronic device to further:

add, in response to enabling of the network parallel control setting by the user, a routing rule of the wireless local area network to a routing rule of the electronic device, wherein a priority of the routing rule of the wireless local area network is higher than a priority of a routing rule of the cellular network, and the routing rule of the wireless local area network comprises a condition for transmitting the data transmission request through the wireless local area network.

20. The non-transitory computer-readable storage medium according to claim 17, wherein an identifier of a network device or an address of the network device is recorded in a routing rule of the wireless local area network, and the electronic device sends the data transmission request to the second electronic device through the network device indicated by the identifier of the network device or the address of the network device.

* * * * *